United States Patent Office 3,432,175
Patented Mar. 11, 1969

3,432,175
PIPE JOINT WHICH CAN BE ASSEMBLED FROM INSIDE PIPE
Teiichi Kawai, Minoo, Japan, assignor to Kubota Iron and Machinery Works, Ltd., Osaka, Japan
Filed May 23, 1966, Ser. No. 552,306
Claims priority, application Japan, June 5, 1962, 40/33,465
U.S. Cl. 277—104
Int. Cl. F16j 15/02; F16l 21/04, 21/02
1 Claim

ABSTRACT OF THE DISCLOSURE

A pipe joint which can be assembled from inside the pipe. An annular packing is interposed between a bell on the one end of one pipe and a spigot end of the next pipe, and a pressing means is positioned adjacent the inner end of the bell and is urged against the packing to pack it tightly between the bell and the spigot end by a series of bolts threaded into a pressing ring and having their heads against the surface at the inner end of the bell.

---

This invention relates to a joint for a pipe which can be applied from inside the pipe.

Pipes have hitherto been joined by means of a joining process from outside the pipe. This outside joining process, however, makes it necessary, in case of underground piping, to resort to the so-called excavation process in which the joining is effected by digging a ditch in the ground from the surface, or to bore a tunnel considerably bigger than the outside diameter of the pipe so as to obtain a large enough space for the joining operation to be effected from the outside.

As to the excavation process, however, it is liable to obstruct traffic, so that this process is usually found to be inapplicable in case of the underground piping in the urban districts.

After all, therefore, the latter process i.e. boring, including the shield process has to be employed in cities. However, since it is very difficult to bore a tunnel of even a small diameter, it involves a greater difficulty and economical disadvantage to bore a tunnel of a big diameter particularly for the purpose of the pipe joining operation.

In view of the above-mentioned difficulties, this invention has made it possible to effect the joining process from the inside of the pipes. The particulars are made clear by the following explanation, taken with the accompanying drawings, in which.

Figure 1:
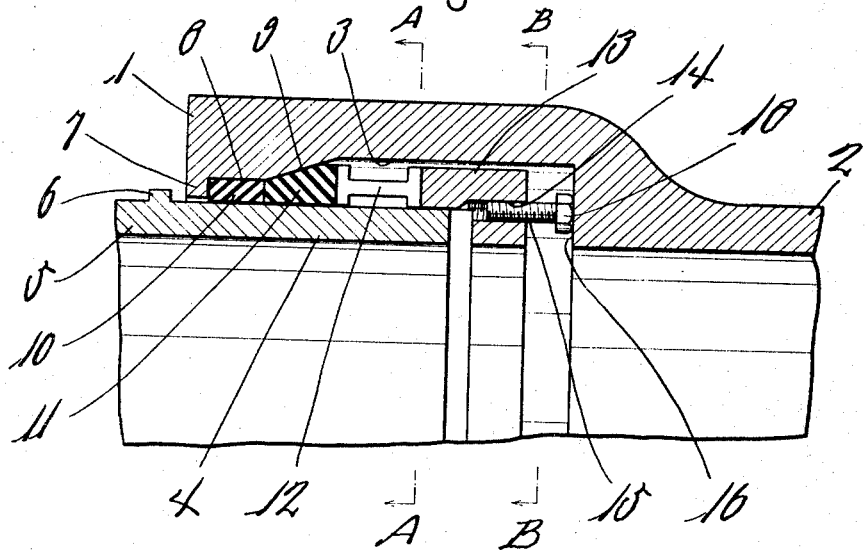
FIG. 1 is an enlarged longitudinal cross section of part of the pipe joint, showing an embodiment of this invention.
Figure 2:
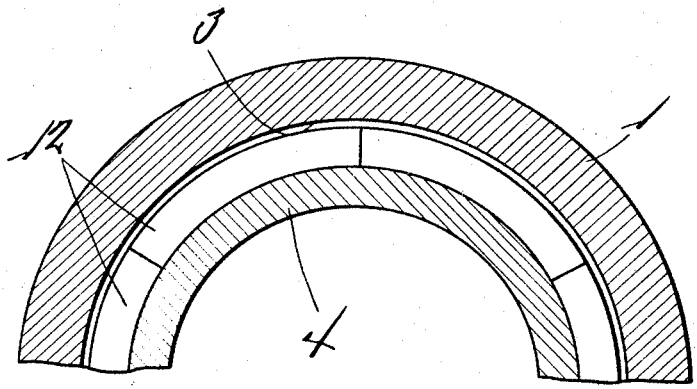
FIG. 2 is a cross section along the line A—A of FIG. 1.
Figure 3:
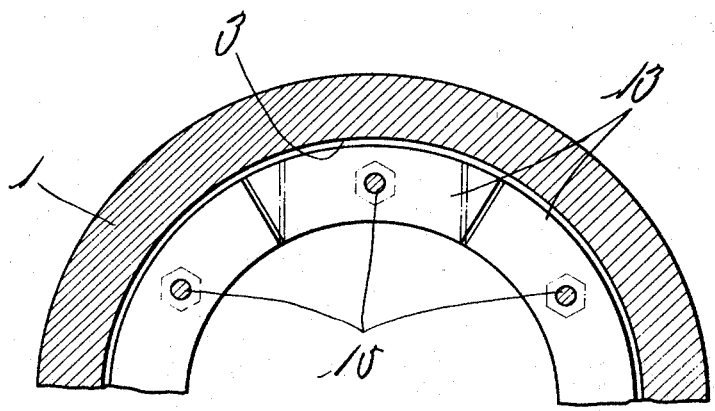
FIG. 3 is a cross section along the line B—B of FIG. 1.

As shown by FIGS. 1, 2 and 3, a bell is formed at one end of the pipe 2, on the inner periphery of which is formed a hollow 3 of a greater diameter than the inside of the pipe 2.

The spigot end 4 of the pipe 5 to be connected to the said pipe 2, has a flange-shaped projection 6 formed on part of the periphery of the said end 4. At the time of joining, the end 4 is inserted into the said bell 1, the projection 6 being then a little outside of the outer end of the bell 1, the end face of the end 4 reaching approximately the middle of the hollow 3, a small gap being formed between the outside periphery of the end 4 and the inside periphery of an inwardly extending rim 7 inside the outer end of the bell 1.

The inside periphery 8 of the bell 1 near the outer edge of the hollow 3 has a diameter less than that of hollow 3, and the inside periphery 8 parallel to the axis of the pipe 2 is joined to hollow 3 by a tapering inside periphery 9. Two elastic circular packings 10 and 11 made of rubber or synthetic resin of a similar quality are adhered to the inside periphery 8 and the inside periphery 9.

A padding ring 12 is fixed between the outside periphery of the end 4 and the hollow 3, and supports the end face of the said packing 11. This padding ring 12 consists of a circular ring divided into a plurality of segments against the end of the said ring 12; opposite the packing 11 there is a pressing ring which also is a circular ring divided into a plurality of segments. The breaks between segments of the said pressing ring and those of the said padding ring 12 are so arranged that they are offset from each other.

The segments of the pressing ring 13 are each provided with a threaded hole 14, and into each of the said threaded holes 14 a bolt 15 is threaded so that the heads 18 of the said bolts 15 will touch the end face 16 at the inner end of the hollow 3. When the bolt 15 is threaded out of the threaded hole 14, the head 18 of the bolt 15 is tightly pressed against the inner end face 16, the reaction of which causes the pressing ring 13 to push the ring toward the packing 11 thus causing the ring 12 to press the packing 11 and 10 at the same time. An individual joining rod, if necessary, can be inserted between the head 18 and the inner end surface 16.

As mentioned above, when the packing 11 is pressed the packing 10 is also pressed. However, as the movement in the outward direction of the bell 1 is prevented by the inwardly extending edge 7, the packings 10 and 11, trying to bulge toward the inside and outside peripheries, press themselves tightly against the outside periphery of the spigot 4 and the inside peripheries 8 and 9 of the bell 1, thus forming an air-tight joint. Besides, one of the segments of the pressing 13 has both end edges parallel as shown by the dot-dash lines in FIG. 3, in order to make the fixture easier to assemble.

In the above-described embodiment, a couple of packings are used. However, the same effect can be obtained by the use of a single packing. As to the pressing device to press the packing, any other device than the one illustrated in the drawings can also be employed. Besides, some filling material, such as mortar and the like, can be placed between the pressing ring 13 and inner end face of the receptacle.

In this invention, a large-calibered pipe bell is formed at the spigot end of the pipe, the end of the other pipe is fitted into the said bell, packings are inserted between the said two parts, and the pressing ring is pressed against the packings from the inside of the bell, causing the packings to bulge toward both inside and outside peripheries. Therefore, the entire process of fixing and pressing the packings can be effected from the inside of the pipe.

As a result, the space outside the pipe necessary for the joining operation can be minimized, so that this invention is suitable for use in the urban districts and inside the tunnels crossing rivers or railways, as well as for piping laid by means of the excavation process. This invention has the advantage that the operation can be easily and economically effected.

The joining operation of this invention is quite simple and the result is so perfect that there is no risk of leakage. Even when some trouble should arise at the joint, repair can be made with ease from the inside of the pipe without the necessity of removing the earth around the pipe.

I claim:

1. A pipe joint which can be assembled from inside the pipe, comprising one pipe section having a spigot end and another pipe section having a bell end into which said spigot end is fitted, said bell end having a surface at the inner end thereof facing outwardly of the bell, an annular packing interposed between the internal periphery of the said bell and the external periphery of said spigot end, a pressing means adjacent the end of the one pipe section within the bell and which is separate from said bell as well as from said spigot end and consisting of a padding ring divided into a plurality of segments and engaging said packing, a pressing ring divided into a plurality of segments and engaging said padding ring, and a bolt threaded into the pressing ring and having the head against the outwardly facing surface at the inner end of the bell, and an internally extending flange at the external edge of the bell, the packing being pressed against the internal periphery of the bell and the external periphery of the spigot end when the packing is pressed by the pressing ring and padding ring from inside the pipe, the flange preventing the packing from moving out of the bell.

References Cited

UNITED STATES PATENTS

| | | | |
|---|---|---|---|
| 2,162,431 | 6/1939 | Helms et al. | 277—102 |
| 2,223,223 | 11/1940 | Muller | 277—102 X |
| 2,247,032 | 6/1941 | Norton | 285—346 X |
| 2,416,917 | 3/1947 | Gleeson | 277—104 |
| 3,159,302 | 12/1964 | Latham et al. | 285—374 X |

FOREIGN PATENTS

| | | |
|---|---|---|
| 852,480 | 10/1952 | Germany. |
| 943,130 | 11/1963 | Great Britain. |

LAVERNE D. GEIGER, *Primary Examiner.*

J. S. MEDNICK, *Assistant Examiner.*

U.S. Cl. X.R.

277—192, 207; 285—338, 274